June 13, 1939. W. ZAPP 2,161,941
FILM FEEDING MECHANISM FOR PHOTOGRAPHIC APPARATUS
Filed Dec. 6, 1937
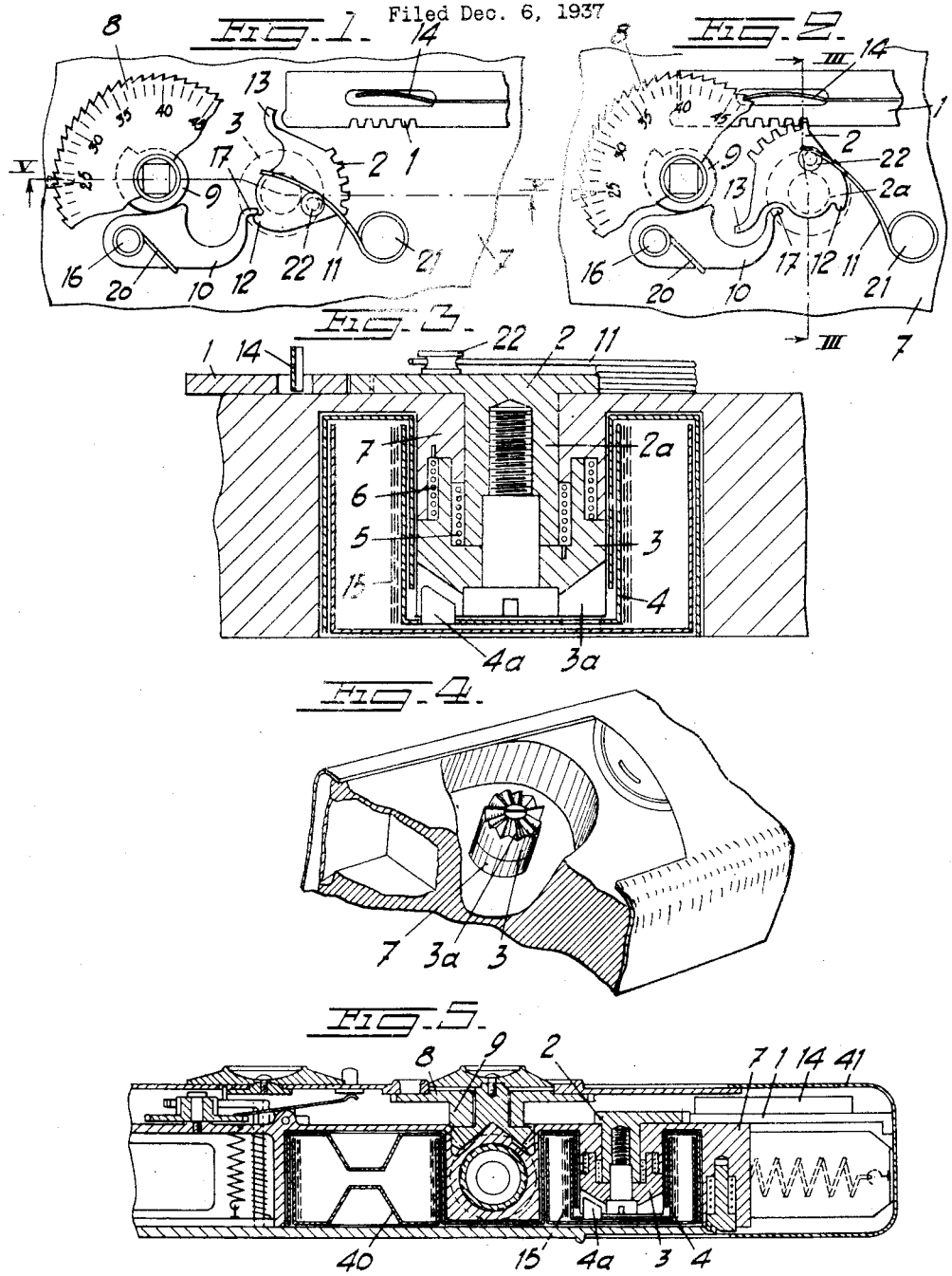
Inventor
Walter Zapp.
By Sommers & Young Attys Patented June 13, 1939

2,161,941

UNITED STATES PATENT OFFICE 2,161,941

FILM FEEDING MECHANISM FOR PHOTOGRAPHIC APPARATUS

Walter Zapp, Riga, Latvia, assignor to Valsts Elektrotechiska Fabrika, Riga, Latvia, a company of Latvia Application December 6, 1937, Serial No. 178,388
In Finland December 21, 1936

4 Claims. (Cl. 242—71)

This invention relates to film feeding mechanisms for photographic apparatus of the type having a roller carrying the film which is to be exposed, a second roller on to which the film exposed is wound, and a manually operated member imparting to said second roller an angular movement when said member is operated.

One object of this invention is to feed the film by steps of equal length, in spite of the increase of diameter of the film roll wound on to the second roller.

Another object of this invention is to provide a simple and positive mechanism by which said angular movement of said second roller will be decreased in the same degree as the diameter of the film roll wound on to said second roller is increasing.

One embodiment of the invention is shown in the annexed drawing.

Fig. 1 shows said mechanism in its position of rest.

Fig. 2 shows the same mechanism in an operative position.

Fig. 3 is a section on a larger scale taken on the line III—III in Fig. 2 and showing the hub of the second roller.

Fig. 4 is a partial perspective view of the photographic apparatus showing the housing for the second roller, said roller and some other parts being broken away.

Fig. 5 is a longitudinal section on the line V—V in Fig. 1.

The invention is especially intended to be used in connection with photographic apparatus of the type described in my co-pending patent application entitled "Improvements in photographic apparatus", Serial No. 178,389, filed December 6, 1937. Some features herein shown and described are claimed in said co-pending application.

Referring now to the drawing 1 indicates a reciprocating member which is manually operated. On a part of its length the reciprocating member is formed as a rack. When applied to the photographic apparatus described in my co-pending patent application mentioned above this member 1 is secured to a movable part 41 of the two piece casing of the apparatus, but said rack 1 may be actuated directly by hand, if desired. The stroke of the rack is always of constant length.

The reference numeral 2 indicates a toothed plate which is rotatably mounted in the frame or casing of the apparatus. The toothed plate 2 has a radial projection 12 and a radially extending arm 13. When the rack 1 is moved forwards (to the left in Fig. 1) the toothed plate 2 is rotated, first by the front end of the rack which engages the arm 13, and then by the toothed portion of the rack which engages the teeth of the plate 2. The toothed plate is connected to the hub 4 of the roller on to which the film 15 is wound. This connection consists of a coupling member 3 and two coil-springs 5 and 6. The spring 5 has one of its ends secured to the coupling member 3, while its other end cooperates with the journal 2a of the plate 2, so as to rotate the coupling member 3, when the plate 2 is rocked forwards. The action of the spring 5 is due to the fact that the spring is arranged in such manner that the windings of the same run in the same direction as the forward rotation of the journal, and exert a light pressure upon the journal 2a. Now, when the journal is rotated forwards it initially carries the end of the spring a short distance; thus the pressure of the windings of the spring against the journal increases, and the moment of rotation will be transmitted from the journal to the coupling member 3. At the return of the plate 2 to its position of rest, the end of the spring slides over the surface of the journal because the diameter of the spring is increased as the end of the spring initially is carried a short distance by the journal. The coupling member is prevented from rotating backwards by means of the spring 6, one end of which is secured to the casing 7, while its other end engages the coupling member. This spring is arranged in a manner similar to that of the spring 5, and acts in a corresponding manner. The spring members 5, 6 form together a unidirectional feeding and stop mechanism, causing the coupling member 3 to rotate stepwise in one direction, while preventing the same from rotating in the opposite direction. The end surface of the coupling member 3 is provided with teeth 3a (see also Fig. 4) which are engaged by corresponding teeth 4a on the hub 4. Thus, for each stroke of the rack 1 to the left in Fig. 1 the film is wound on to the hub 4 a distance corresponding to the length of a picture on the film.

Now, the diameter of the film roll increases as the film is wound on to the roller 4. Thus, for feeding the film, for each stroke of the rack 1, by steps of a constant length corresponding to the length of a picture, it is necessary to decrease the angle of rotation of the toothed plate 2 in the same degree as the diameter of the film roll increases. For this purpose a stop 17 is formed on the end of a lever 10 fulcrumed on a pin 16 in the casing of the apparatus. This lever 10 is held by a spring 20 against a helical cam 9 attached to a toothed disc 8 having graduations marked thereon indicating the number of pictures exposed. The rack 1 carries a spring plate 14, acting as a pawl for feeding the disc 8 stepwise when the rack 1 is moved forwards. A spring 11 is secured to the stationary stud 21 and rests on a pin 22 of the plate 2, to be tensioned when the rack 1 is moved forwards.

The roller from which the film 15 is wound on to the roller 4 is indicated by 40.

This device acts as follows:

Assuming that the parts of the mechanism are in the position shown in Fig. 2 and that the film roll on the roller 4 has its smallest diameter, corresponding to the first picture. Now, when the rack 1 is moved backwards (to the right in Fig. 2) the rack 1 will operate the toothed plate 2 only as long as the teeth of the rack 1 engage those of the plate 2. During the subsequent portion of the backward motion of the rack 1 the plate 2. under the action of the spring 11, will continue its rocking motion until the arm 13 engages the end of the rack 1. For the next picture. the rack 1 is moved forwards causing the plate 2 to be rocked an angle as described above, and simultaneously causing the parts 8, 9 to be turned one step forwards by the action of the plate 14. Consequently also the lever 10 with its stop 17 is turned a corresponding angle. Thus, the stop 17 causes the plate 2, during its returning motion, to stop at an earlier point. For each subsequent picture the stop 17 will be turned a certain distance forwards in the path of motion of the projection 12 and the angle of rotation of the toothed plate 2 will decrease in the same degree as the diameter of the film roll on the roller 4 increases. When this film roll has attained its maximum diameter the projection 12 will meet the stop 17 already as the teeth of the plate 2 disengage the rack 1.

What I claim is:

1. A film feeding mechanism for photographic apparatus having a roller for carrying the film to be exposed, a second roller on to which the exposed film is wound, a rotatably mounted toothed plate operatively connected to said second roller by means of an unidirectional step-by-step feeding mechanism, a reciprocable rack, manually operable means for reciprocating said rack through strokes always of constant length, said rack being positioned to engage said toothed plate for turning said plate when moved in one direction, and for returning said plate a certain distance when moved backwards, a spring engaging said toothed plate for continuing the return motion of said toothed plate after said rack has returned said plate said certain distance, a projection on said toothed plate, and a stop located in the path of motion of said projection, and means operated by said rack on each stroke thereof for adjusting the position of said stop forwardly a certain distance in said path of motion of the projection.

2. A film feeding mechanism for photographic apparatus having a roller for carrying the film to be exposed, a second roller on to which the exposed film is wound, a rotatably mounted toothed plate operatively connected to said second roller by means of an unidirectional step-by-step feeding mechanism, a reciprocable rack, manually operable means for reciprocating said rack through strokes always of constant length, said rack being positioned to engage said toothed plate for turning said plate when moved in one direction, and for returning said plate a certain distance when moved backwards, a spring engaging said toothed plate for continuing the return motion of said toothed plate after said rack has returned said plate said certain distance, a projection on said toothed plate, and a lever carrying a stop located in the path of motion of said projection, means operated by said rack on each stroke thereof for carrying the position of said stop forwardly a certain distance in said path of movement of the projection.

3. A film feeding mechanism for photographic apparatus having a roller for carrying the film to be exposed, a second roller on to which the exposed film is wound, a rotatably mounted toothed plate operatively connected to said second roller by means of a unidirectional step-by-step feeding mechanism, a reciprocable rack, manually operable means for reciprocating said rack through strokes always of constant length, said rack being positioned to engage said toothed plate for turning said plate when moved in one direction, and for returning said plate a certain distance when moved backwards, a spring engaging said toothed plate for continuing the return motion of said plate after said rack has returned said plate said certain distance, a projection on said toothed plate, a graduated toothed disc for counting the number of pictures exposed, means operated by said rack to turn said disc one step on each forward stroke of the rack corresponding to each picture taken, a helical cam mounted on said disc, a lever carrying a stop lying in the path of return motion of said projection, and a spring engaging said lever to press said lever yieldingly against said helical cam whereby the position of the stop on said lever is progressively adjusted according to the number of pictures taken and the return motion of the toothed plate is progressively diminished corresponding to the position of said stop.

4. A film feeding mechanism for photographic apparatus having a roller for carrying the film to be exposed, a second roller on to which the exposed film is wound, a rotatably mounted toothed plate operatively connected to said second roller by means of a unidirectional step-by-step feeding mechanism, an arm on said toothed plate, a reciprocable rack, manually operable means for reciprocating said rack through strokes always of constant length, said rack being positioned to engage first said arm and thereafter the teeth of said toothed plate to rock said plate, a spring engaging said toothed plate for continuing the return motion of said toothed plate after said rack has returned the latter a certain distance, a projection on said toothed plate, and a stop in the path of motion of said projection, means operated by said rack for adjusting the position of said stop progressively forwardly step by step, one step for each forward stroke of said rack, whereby the return motion of the toothed plate is progressively diminished.

WALTER ZAPP.